(12) United States Patent
Pacholski

(10) Patent No.: US 8,813,688 B2
(45) Date of Patent: Aug. 26, 2014

(54) HEAT EXCHANGER

(75) Inventor: Adam Pacholski, Gdynia (PL)

(73) Assignee: AIC S.A., Gdynia (PL)

( * ) Notice: Subject to any disclaimer, the term of this patent is extended or adjusted under 35 U.S.C. 154(b) by 680 days.

(21) Appl. No.: 13/088,835

(22) Filed: Apr. 18, 2011

(65) Prior Publication Data

US 2012/0138278 A1 Jun. 7, 2012

Related U.S. Application Data

(63) Continuation-in-part of application No. 12/957,760, filed on Dec. 1, 2010, now Pat. No. 8,720,387.

(51) Int. Cl.
*F28D 7/00* (2006.01)
*F22B 1/02* (2006.01)

(52) U.S. Cl.
USPC .................. 122/15.1; 122/31.1; 122/332

(58) Field of Classification Search
CPC ............. F24H 8/00; F24H 1/40; F24H 1/523; F24H 1/205; F24H 1/206; F24H 9/122
USPC ................. 122/15.1, 18.1, 31.1, 32, 33, 42, 122/235.11, 235.15, 235.31, 332; 165/159
See application file for complete search history.

(56) References Cited

U.S. PATENT DOCUMENTS

| | | | | |
|---|---|---|---|---|
| 2,906,250 A | * | 9/1959 | Clarkson | 122/165 |
| 4,846,150 A | * | 7/1989 | Maton | 122/18.2 |
| 4,858,684 A | * | 8/1989 | Brucher et al. | 165/134.1 |
| 5,027,749 A | * | 7/1991 | Cifaldi | 122/18.31 |
| 5,546,760 A | * | 8/1996 | Cook et al. | 62/497 |
| 6,945,197 B2 | * | 9/2005 | Ryoo | 122/15.1 |
| 7,220,392 B2 | * | 5/2007 | Rong et al. | 422/201 |
| 7,559,293 B2 | * | 7/2009 | Gordon et al. | 122/13.01 |
| 8,375,898 B2 | * | 2/2013 | Min | 122/18.1 |
| 8,418,753 B2 | * | 4/2013 | Hirokawa et al. | 165/177 |
| 2001/0027756 A1 | * | 10/2001 | Vago | 122/18.2 |

FOREIGN PATENT DOCUMENTS

| | | | |
|---|---|---|---|
| EP | 1983272 A1 | 10/2008 | |
| EP | 2080962 A1 | 7/2009 | |
| EP | 2123991 A1 | 11/2009 | |
| EP | 2133634 A1 | 12/2009 | |

\* cited by examiner

*Primary Examiner* — Charles E Anya
(74) *Attorney, Agent, or Firm* — Charles D. Gunter, Jr.

(57) ABSTRACT

A heat exchanger comprising an outer jacket (9) with an inner set of vertical pipe elements (1) fastened at their opposing ends in upper and lower sieve walls (2, 3), and having a gas combustion chamber (4) located above the upper sieve wall, as well as partitions (5, 6, 7) mounted crosswise of the pipe elements. The partitions have openings for the pipe elements. The heat exchanger is also provided with liquid, gas and exhaust fumes inlet and outlet stub pipes. The outer jacket is conically shape with its diameter increasing upwards. An upper sieve wall (2), is essentially flat as viewed from the side, while an upper partition (5) situated below the wall, is shaped as a cone with its vertex pointing down. The upper partition (5) has a central opening (8) in its central region and an outer diameter corresponding to a diameter of the outer jacket (9).

10 Claims, 3 Drawing Sheets

HEAT EXCHANGER

CROSS-REFERENCE TO RELATED APPLICATIONS

The present application is a continuation-in-part of previously filed U.S. Ser. No. 12/957,760, filed Dec. 1, 2010, now U.S. Pat. No. 8,720,387 entitled "Heat Exchanger", by the same inventor. This case also claims priority from an earlier filed Polish application, Serial No. P392560, filed Oct. 1, 2010, entitled "Heat Exchanger" by the same inventor.

BACKGROUND OF THE INVENTION

1. Field of the Invention

The present invention relates generally to heat exchangers of the type belonging to the group of pipe exchangers designed to exchange heat between a gas and a liquid and, more particularly, to such heat exchangers designed to be used in heat engineering, especially in domestic central heating systems.

2. Description of the Prior Art

Many kinds of pipe heat exchangers are known having different structures depending on their particular environment of use, the fluids circulating in a heat exchange system as well as special demands and needs. A system of pipe elements in which a hot gas or liquid flow is a common feature of pipe heat exchangers, said elements being fastened between two sieve walls and situated in a chamber enclosed in an outer jacket in which heated water or gas circulates. In the case of heat exchangers for domestic central heating systems, in which heat is created by using gas as a fuel, such exchangers are known which are provided with a combustion chamber situated above the upper sieve wall and also having a water inlet as well as a water outlet stub pipes, a gas inlet stub pipe and an exhaust stub pipe. A set of pipe elements is positioned vertically in such exchangers. Heat exchangers are also known for use in the heat power engineering field. Such exchangers are designated as condensers or liquefiers and are built-up of many sets of pipe elements located in a chamber confined with an outer jacket. Pipes of said exchangers are fastened between perforated bottom elements with water chambers situated there between. Such exchangers are used, for example, where water working as an agent for cooling steam provided from outlets of turbines into a chamber closing said pipes is introduced into said pipes. In pipe exchangers of different kinds such as these, and in order to increase the heat exchange efficiency, pipe elements are used of different shapes and inner areas, as well as additional elements of different kinds, such as partitions, additional pipes and the like.

From the Polish patent specification No 1 8 6723 a pipe liquid-to-gas heat exchanger is known in which hot gas is introduced into a chamber closed by an outer jacket, said gas being cooled when flowing around pipes fastened between flat sieve bottoms. A cooling agent flows through these pipes, said agent being delivered and carried out through stub pipes situated in a cover of the sieve bottom. Liquefied gas is drained off an outlet stub pipe situated in an outer jacket surrounding the heat exchange chamber. Additional perforated pipes are also located in this chamber, whereas end parts of said pipes are going through the sieve bottom, and are connected with a collecting pipe which is connected to a vapors off-take pipe. The perforated pipes are used to suck out air from a gas space in the exchanger and to lead it out from the exchanger. Partitions are also located in the exchanger chamber, said partitions being situated crosswise in relation to pipe elements.

From the published international patent application No. WO2008/131616, a heat exchanger is also known comprising an outer cylindrical jacket having inlet and outlet stub pipes with a packet of pipe elements located in said jacket, said pipe elements going through a spiral partition and being connected to sieve walls shaped as flat discs closely forming to the cylindrical outer jacket. These tie rods are from one side fastened in a sieve wall, and their other ends are fastened in the spiral partition. The tie rods are divided into segments provided with distance pipes. Such an exchanger may also be provided with additional pipes going through the spiral partition without being fastened in the sieve walls, upgrading stiffness, protecting against deformations and making it easier to match openings in the spiral partition to the exchanger pipes. The construction of this spiral partition is disclosed in detail and in the cited specification.

From the published international patent application no WO2009/078577 a boiler is known comprising a cylindrical casing, a vertical liquid-gas exchanger, a burner located in a combustion chamber of said exchanger, as well as an inlet and outlet of the water being heated, an exhaust gas outlet, a gas inlet and an instrumentation enabling air supply and making suitable air-gas mixture, and moreover provided with a control device. This embodiment of a heat exchanger has a set of pipe elements rectangular in a section, said pipe elements being regularly distributed inside an outer jacket forming a chamber through which the heated water flows. Upper ends of these pipes are fastened in a flat upper sieve wall, above which there is located a combustion chamber, their lower ends are through a flat lower sieve wall and a combustion gases recycling chamber connected to a combustion gases outlet channel.

Flat partitions, shaped as perforated discs, are located in the water chamber, said pipe elements being run through said discs. These separating partitions improves the heat exchange characteristics because they disturb the water circulation. The partitions are located crosswise to the pipe elements, their diameter is smaller than the inner diameter of the jacket of the exchanger in order to create between the partitions and the jacket slots through which water flows. The partitions are situated crosswise to the pipe elements, their diameter installer than the inner diameter of the jacket of the exchanger so that water flow slots are created. An impact of the width of said slots onto the water circulation and the water pressure acting onto partitions is discussed in the previously cited specification.

The solution described in the previously cited reference proposes to provide said partitions with circulation pipes protecting against a greater water pressure acting onto said partitions, the upper ends of said pipes being fastened in the highest partition, and the lower ends being fastened in the lowest partition. There is also shown an alternative in which walls of the pipe elements are situated in a distance from the edges of openings in those partitions through which they are going, which design makes the water flow disturbances greater, thereby improving the heat exchange efficiency. The described boiler is provided with an additional independent water circuit through spiral pipes disposed in the water chamber around the combustion chamber.

Despite the various advances described in the above prior art references, their continues to exist a need for further improvements in the art of heat exchangers of the type under consideration.

SUMMARY OF THE INVENTION

A heat exchanger according to the invention is described having an outer jacket with a set of vertical pipe elements fastened at their ends, at each of the opposite extents thereof in sieve walls, and having a gas combustion chamber located above an upper sieve wall, as well as partitions mounted crosswise to the pipe elements. The partitions have openings for the pipe elements. The heat exchanger is also provided with liquid, gas and exhaust fumes inlet and outlet stub pipes, characterized in that said outer jacket is conically shaped with its diameter increasing in an upwards direction. In one version of the invention, an upper sieve wall as well as an upper partition lying below said wall are shaped as cones with their vertexes pointing down, said upper partition having a central opening in its central part and its outer diameter corresponding to a diameter of the outer jacket.

The upper sieve wall and the upper partition both converge downwardly toward the central opening in planes which are non-parallel, each defining a conical surface. If a "divergence angle" is drawn which measures the degree of opening or "flare" of each conical surface, then the resulting divergence angle of the first cone forming the upper sieve wall is greater than a divergence angle drawn for the second cone which forms the upper partition.

Preferably, a divergence angle of a first cone forming an upper sieve wall is an obtuse angle which is greater than 90° but less than 170°. The flare angle of the second cone which forms the upper partition can also be greater than 90° but less than 170°, as long as the resulting divergence angle is less than that of the first cone forming the upper sieve.

Cones of the upper and lower sieve walls can be provided having the same obtuse angle.

In another version of the invention, the upper partition is again shaped as a cone with its vertex pointing down, the upper partition having a central opening in its central part and its outer diameter corresponding to a diameter of the outer jacket. However, in this case, the upper sieve wall is essentially flat, rather than being shaped as a cone. In other words, for this second version of the invention, the previously defined "divergence angle" is greater than 90° but less than or equal to 180°, preferably equal to approximately 180°. All other features of the design are the same.

In both embodiments of the invention, the lower sieve wall can be shaped as a cone having its vertex directed downwards.

In one advantageous embodiment of the invention, the successive partitions have alternately an outer diameter corresponding to a diameter of the outer jacket and smaller than a diameter of the outer jacket, whereas the partitions having an outer diameter corresponding to the diameter of the outer jacket have a central opening in their central part.

In the most advantageous embodiment of the exchanger its upper partition can be provided with evenly distributed additional openings. These additional openings are distributed on a locus of points defining one circle or on many concentric circles.

The improved solution provided by the present invention is especially advantageous because it essentially increases the effectiveness of heat exchange processes along the whole height of the pipe elements in the exchanger, as well as in the area of the upper sieve wall and the combustion chamber.

Additional objects, features and advantages will be apparent in the written description which follows.

DETAILED DESCRIPTION OF THE INVENTION

Figure 1:
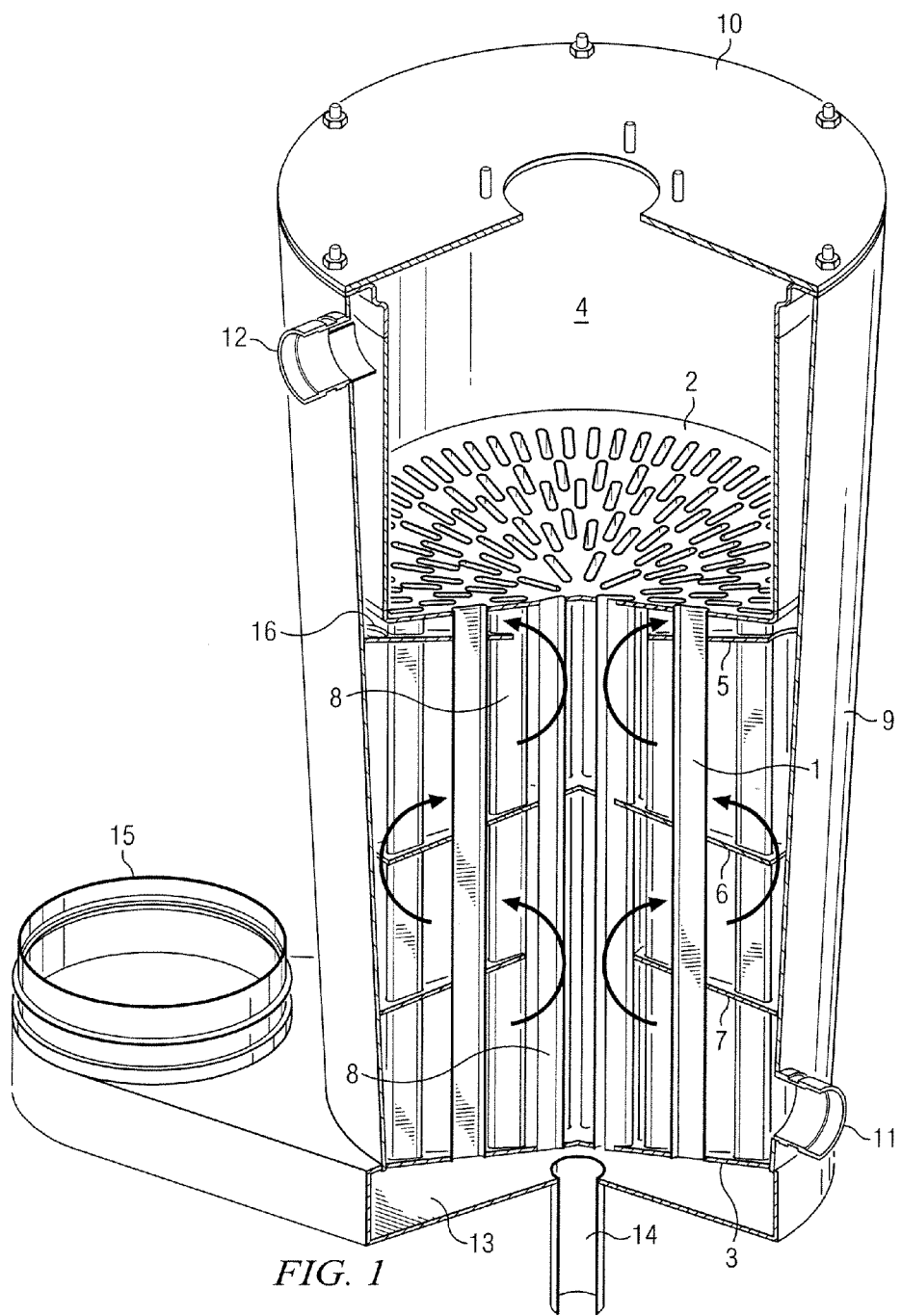
FIG. 1 is an elevational view of the improved heat exchanger of the invention with portions broken away for ease of illustration.
Figure 2:
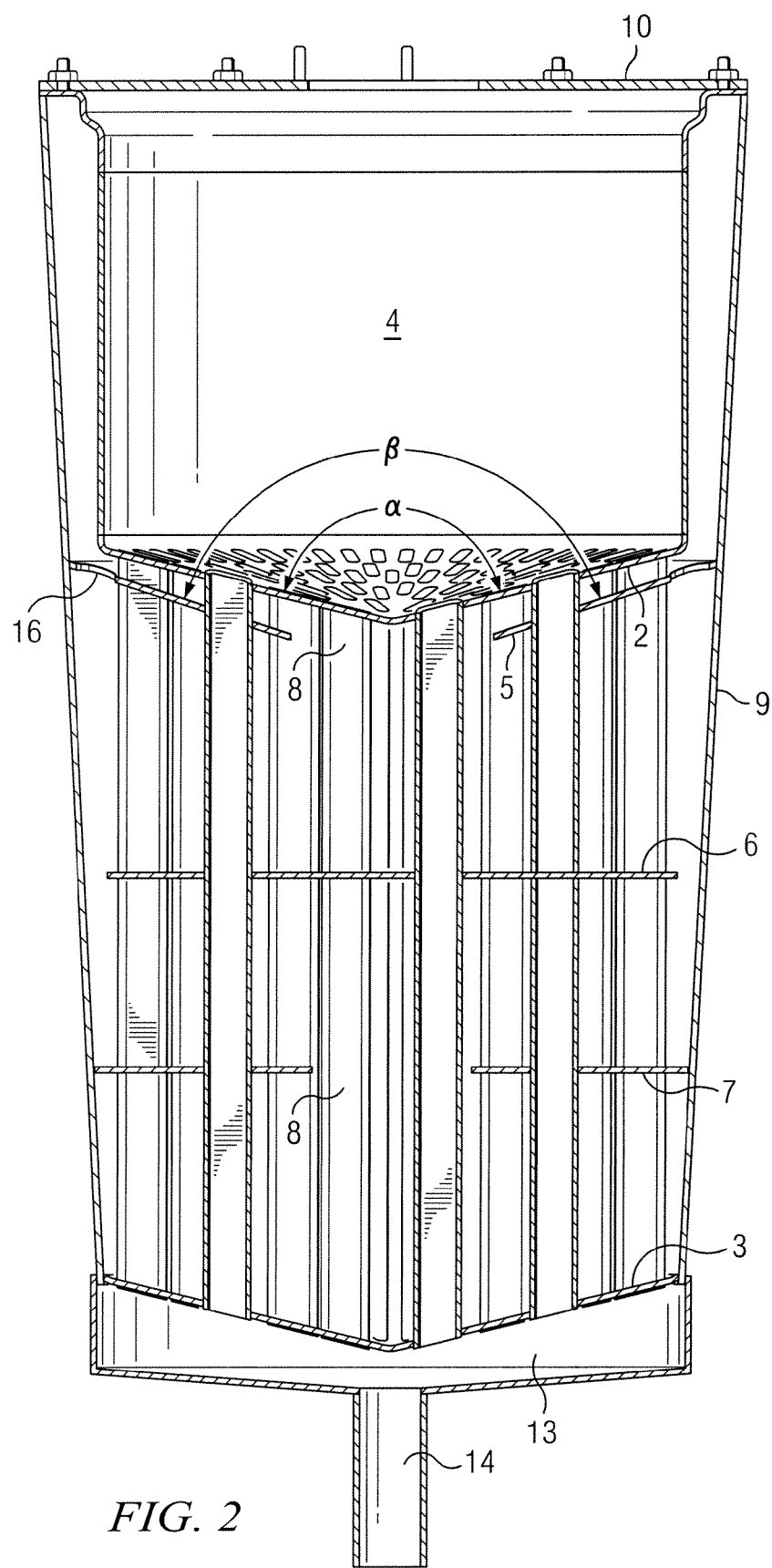
FIG. 2 is a side, cross sectional view of the heat exchanger of FIG. 1.

A first embodiment of a heat exchanger according to the present invention is shown in the drawings in which FIG. 1 shows the inside of the heat exchanger with portions thereof broken away for ease of illustration and FIG. 2 shows the inside of the exchanger in the longitudinal section.

This first version of a heat exchanger according to the principles of the present invention is built up of a vertical set of pipe elements 1, having generally rectangular cross-sections situated in a radiant arrangement, the respective opposing ends of said elements are connected at an upper end to the upper sieve wall and at the opposing lower end to a lower sieve wall 3, as by using welding techniques. The upper and lower sieve walls 2,3 are preferably conically shaped. The upper and lower sieve walls 2, 3 can have the same shape with the first cone having its vertex directed downwards.

With reference to FIG. 2 for the first version of the heat exchanger of the invention, it can be seen that the upper sieve wall 2 and the upper partition 5 both converge downwardly toward central opening 8 in planes which are non-parallel, each defining a conical surface. If a "divergence angle", i.e., the angles $\alpha$ and $\beta$ in FIG. 2, are drawn which measure the degree of opening or "flare" of each conical surface, then the resulting "divergence angle" $\alpha$ of the first cone forming the upper sieve wall 2 can be seen to be greater than a divergence angle $\beta$ drawn for the second cone which forms the upper partition 5.

Preferably, the divergence angle $\alpha$ of the first cone forming an upper sieve wall 2 is an obtuse angle which is greater than 90° but less than 170°. The flare angle $\beta$ of the second cone which forms the upper partition 5 can also be greater than 90° but less than 170°, as long as the resulting divergence angle is less than that of the first cone forming the upper sieve 2. The angle $\alpha$ can be, for example, in the range from about 130 to 160°, while the angle $\beta$ might be, for example in the range from about 120-150°, again so long as the angle $\alpha$ remains greater than the angle $\beta$.

In the particular embodiment of the invention illustrated, the angle $\alpha$ is approximately 155° and the angle $\beta$ is approximately 145°.

Above the upper sieve wall 2, there is situated a cylindrical combustion chamber 4 made of metal sheet and connected by welding with said sieve wall 2. Three horizontal partitions 5, 6, 7 are mounted across the set of pipe elements. The partitions 5, 6, 7 have a row of openings corresponding to the section of pipe elements 1, which are going through these openings. The upper partition is shaped to form the second cone having its vertex directed downwards. As has been explained, the divergence angle $\beta$ of this second cone is smaller than the divergence angle $\alpha$ of the first cone, and equals approximately 130° in the exemplary case illustrated in the drawings. The middle partition 6 and the lower partition 7 are shaped as flat discs. A relatively large central opening 8 is located in the middle part of the upper partition 5 and of the lower partition 7.

A package made up of a set of the pipe elements 1, the sieve walls 2, 3, the partitions 5, 6, 7, and the cylindrical combustion chamber 4 is enclosed in the outside jacket 9 shaped as a truncated cone with its diameter increasing upwards. The upper partition 5 and the lower partition 7 have their outer diameters corresponding to the inner diameters of the outer jacket 9, whereas the middle partition 6 has its outer diameter smaller than the inner diameter of the outer jacket 9 at the height of said partition.

The exchanger is closed from the upper side by a cover 10 provided with a gas inlet stub pipe, an opening for a burner with a valve-ventilation system, as well as other conventional elements essential for assembling the fittings and housing of a boiler comprising said heat exchanger.

The lower sieve wall 3 is connected permanently to the inner jacket 9 by welding in the indicated joint locations. The cover 10 is connected separately by means of screws with the outer jacket and with the combustion chamber 4. The water inlet stub pipe 11 (shown in FIG. 1) and water outlet stub pipe 12 are situated respectively in the lower side and the upper side of the outer jacket 9, and the lower tank 13 is located under the lower sieve wall 3. The condensate outlet stub pipe 14 and the exhaust fumes outlet stub pipe 15 are located in this lower tank 13. In the particularly preferred embodiment of the exchanger of the invention illustrated in FIG. 1, the upper partition 5 has a series of additional openings 16 evenly arranged in a circle between the set of pipe elements 1.

The exchanger is designed to burn natural gas and propane in order to generate the heat needed to warm up water used in central heating systems. Gas is burnt in the upper part of the exchanger in the combustion chamber 4, and then combustion fumes flow by the pipe elements 1 vertically downwards to transfer heat into the water being heated. The water is circulating in the outer jacket 9 between the water inlet 11 and the water outlet 12. Flowing down combustion fumes are cooled below their dew-point, and are gathered in the lower tank 13. From here they flow outside together with the rest of the condensate through the condensate outlet 14 and the combustion fumes outlet 15.

The heated water flows outside the pipe elements 1 in counter flow in relation to the flowing combustion fumes. In this way, water is introduced by the water inlet stub pipe 11 situated in the lower part of the exchanger, and flows upwards, washing the pipe elements 1 and the combustion chamber 4. It is then carried out from the exchanger by means of the water outlet stub pipe 12 located in the upper part of the exchanger.

The pipe elements 1 and the combustion chamber 4 are suitably washed, said washing being forced by the provided set of partitions. The flow is directed by the central opening 8 made in the lower partition 7 to the central part of the exchanger and then to walls of the outer jacket 9 around the outer edges of the middle partition 6 and afterwards once more to the middle point from which a flow is directed through the central opening 8 made in the upper partition 5 to the central point of the upper sieve wall 2. In this way, this wall, together with the combustion chamber, is washed evenly in all directions. Any water which happens to be stopped in dead areas below the upper partition 5 flows through the additional openings (16 in FIG. 1) provided in this partition 5.

In the exemplary embodiment illustrated in FIGS. 1 and 2 of the drawings, the exchanger comprises 20 pipe elements. It's height is 600 mm, the diameter of its upper part being approximately 350 mm, and the diameter in the lower part as well as the diameter of the combustion chamber being approximately 300 mm. A exchanger constructed as described ensures a maximum outlet water temperature of approximately 90° C.

In other embodiments of the first described version of the invention the heat exchanger having an upper cone sieve wall and an upper cone partition may comprise a different number of remaining partitions having an alternately different outer diameter and being alternately provided with great central openings. In an advantageous embodiment the lower sieve wall is a cone wall shaped exactly in the same way as the cone of the upper sieve wall, but in other embodiments of the exchanger these cones have different divergence angles and the lower sieve wall may be flat or may be shaped in another way. Sections and arrangement of the pipe elements may differ as well in some versions of the exchanger.

Figure 3:
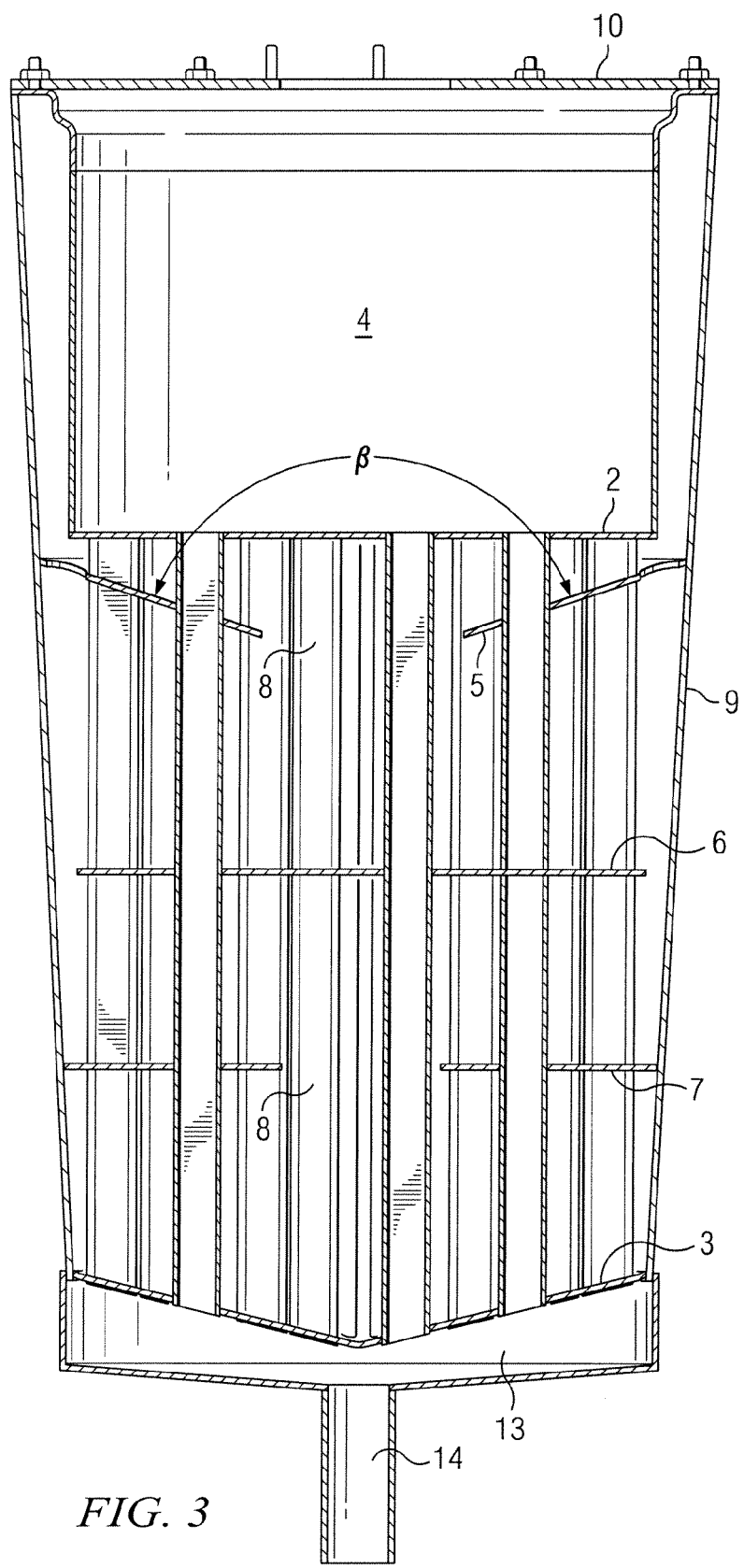
FIG. 3 is a side, cross sectional view, similar to FIG. 2, but showing a second version of the invention with a flat upper sieve wall.

FIG. 3 shows another version of the heat exchanger of the invention. It will be evident that all of the design features of this version of the heat exchanger are basically identical to those of the first version shown in FIGS. 1 and 2 with the exception of the upper sieve wall (2 in FIG. 3). In this case, the upper sieve wall 2 is a planar or near planar surface as viewed from the side. In other words, the upper sieve wall 2 is basically flat, rather than being conically shaped. In terms of the previously defined "divergence angle" described with respect to FIG. 2, the angle formed by the upper sieve wall 2 in FIG. 3 is greater than 90°, but less than or equal to 180°, preferably equal to approximately 180°. The angle β, which represents the divergence angle of the upper partition 5, is not particularly critical, and can be in the range, for example, from about 120°-160°, preferably about 130°-150°. In the particular example illustrated in FIG. 3, the angle β, which represents the divergence angle of the upper partition 5, is approximately 145°.

In the case of the first version of the invention having a conically shaped upper sieve wall, the shapes of the upper and lower sieve walls 2, 3, as well as shapes of the corresponding central openings in the partitions, produce an unusually advantageous water circulation in the exchanger, increasing its heat exchange efficiency. The improved efficiency is due in part to the increased flow speed of the liquid washing the upper sieve wall and the combustion chamber in the area of the combustion chamber as a result of the newly designed shape of the upper sieve wall 2 and the upper partition 5. The improved efficiency is also particularly the result of the difference between the divergence of the first cone creating the upper sieve wall and the second cone creating the upper partition. The particular choice of angles for these surfaces results in the advantageous influence of increasing the heat exchange efficiency in the region of the combustion chamber. The additional openings 16 in the upper partition 5 prevent creation of so called "dead zones" under the partition without any movement of water by allowing a controlled flow. This is accomplished by means of a liquid leakage between areas under the partition and above the partition in the determined places.

In the case of the second version of the invention with the essentially flat upper sieve wall and conically shaped upper partition, the water circulation may not equal that of the first version of the invention. However, the second version with its flat upper sieve wall is a much more economical manufacturing solution because the manufacturing process is extremely simple, especially where the flat or conically shaped sieve walls are desired to be made of relatively thick materials. Thus, in some senses, the second version of the invention provides the best balance between cost and efficiency in a heat exchanger of this type.

Another factor to be considered in comparing the two designs is the fact that the first version of the heat exchanger with the conically shaped upper sieve wall the water flow has laminar characteristics. In some situations where the water being used has a high mineral content, this characteristic could possibly lead to limestone build-up. In the case of the second heat exchanger with the flat upper sieve wall, the water flow between the sieve wall and the upper partition is turbulent and any possibility of limestone build-up is reduced because of the continuous mixing of the water. In other words, the layer of water which is directly below the upper sieve wall is not overheated. These factors may extend the useful life of the heat exchanger in the particular situation outlined above. This characteristic of turbulent water flow does not create the optimal heat exchange situation created by the first version of the invention, but the turbulent flow of the water helps to make the difference in the efficiency of the two designs less significant.

While the invention has been shown in only two of its forms, it is not thus limited but is susceptible to various changes and modifications without departing from the spirit thereof.

I claim:

1. A heat exchanger, comprising:
   an outer jacket;
   an inner set of vertical pipe elements having opposing ends, the pipe elements being fastened at their respective opposing ends between an upper and a lower sieve wall;
   a gas combustion chamber located above the upper sieve wall;
   a plurality of partitions mounted within the outer jacket in crosswise relationship to the vertical pipe elements, the partitions having openings for receiving the pipe elements;
   wherein the heat exchanger is also provided with liquid, gas and exhaust fumes inlet and outlet stub pipes;
   the heat exchanger also being further characterized in that the outer jacket is conically shaped with a diameter which increases in an upward direction; and
   wherein the upper partition which is situated below the upper sieve wall is shaped as a cone having a vertex which points downwardly, the upper partition having a central opening provided in a central region thereof, and an outer diameter which corresponds to a diameter of the outer jacket.

2. The heat exchanger of claim 1, wherein the upper sieve wall forms a planar or near planar surface, as viewed from the side, while the upper partition converges downwardly toward the central opening in a plane which is non-parallel to that of the upper sieve wall, thereby defining a conical surface of a cone, whereby if a divergence angle is drawn which measures a degree of opening or flare of the conical surface of the upper partition, then the planar surface of the upper sieve wall will form a greater divergence angle than the divergence angle drawn for the cone which forms the upper partition.

3. The heat exchanger of claim 2, wherein the divergence angle of the upper sieve wall is greater than 90° but less than or equal to 180°.

4. The heat exchanger of claim 3, wherein the divergence angle of the upper sieve wall is approximately 180°.

5. The heat exchanger of claim 2, wherein the divergence angle of the upper partition is in the range from about 120°-160°.

6. The heat exchanger of claim 5, wherein the cones of the upper partition and lower sieve wall each have the same divergency angle.

7. The heat exchanger of claim 1, wherein the lower sieve wall, like the upper partition, is also shaped as a cone having its vertex directed downwards.

8. The heat exchanger of claim 1, wherein successive partitions located within the outer jacket have alternately an outer diameter corresponding to the diameter of the outer jacket and then smaller than the diameter of the outer jacket, whereas the partitions having an outer diameter corresponding a diameter of the outer jacket also have a central opening in to central region thereof.

9. The heat exchanger of claim 8, wherein the additional openings are located in a locus of points which define one circle or a plurality of concentric circles.

10. The heat exchanger of claim 1, wherein the upper partition is provided with evenly distributed additional openings in the conical surface thereof.

* * * * *